United States Patent [19]
Kimura et al.

[11] Patent Number: 5,717,669
[45] Date of Patent: Feb. 10, 1998

[54] INFORMATION RECORDING AND PLAYBACK DEVICE AND ASSOCIATED DISK-TYPE STORAGE MEDIUM

[75] Inventors: Isao Kimura, Tokyo; Naoto Inaba, Hiratuka, both of Japan

[73] Assignee: Nikon Corporation, Tokyo, Japan

[21] Appl. No.: 361,807

[22] Filed: Dec. 22, 1994

[30] Foreign Application Priority Data

Dec. 22, 1993 [JP] Japan .................................. 5-345633
Jun. 9, 1994 [JP] Japan .................................. 6-127187

[51] Int. Cl.$^6$ ............................................. G11B 7/00
[52] U.S. Cl. ..................... 369/48; 369/50; 369/32; 369/58
[58] Field of Search ........................ 369/48, 47, 49, 369/50, 54, 58, 59, 44.28, 44.26, 124, 32

[56] References Cited

U.S. PATENT DOCUMENTS

5,477,512 12/1995 Kubo et al. ...................... 369/58 X

Primary Examiner—Muhammad N. Edun

[57] ABSTRACT

An information recording and playback device for use with disk-type medium formatted in a ZCAV format. Sector marks are written on the disk-type recording medium and differ in frequency according to the zone to which the sector belongs. Where frequencies in adjacent zones are close, sectors in adjacent zones can be written with different polarities or sizes. The information recording and playback device is provided with a number of sector mark detection circuits, which number the same or less than the number of zones formed on the recording surface of the disk. Each sector mark detection circuit is set to correspond to one zone, and output a signal when the pattern of the sector marks of the zone to which that sector mark detection circuit corresponds can be detected. When the sector mark is detected by one of these sector mark detection circuits, the actual position of the head is determined. Then, the frequency of a reference clock signal is switched to a clock signal which has a frequency equal to the recording frequency which corresponds to zone where the head is located. Where the number of sector mark detection circuits is less than the number of zones, the sector mark detection circuits are configured so that they can detect the patterns of the sector marks of all zones by changing the settings to match the target zone containing the target sector and as many adjacent zones as can be covered by the other sector mark detection circuits.

10 Claims, 4 Drawing Sheets

| NRZ INPUT BIT | (1,7) MODULATION CHANNEL BIT |
|---|---|
| 1 0 | X 0 0 |
| 0 1 | 0 1 0 |
| 1 1 | X 0 1 |
| 0 0 1 0 | X 0 0 0 0 1 |
| 0 0 0 1 | X 0 0 0 0 0 |
| 0 0 1 1 | 0 1 0 0 0 0 |
| 0 0 0 0 | 0 1 0 0 0 0 |

INFORMATION RECORDING AND PLAYBACK DEVICE AND ASSOCIATED DISK-TYPE STORAGE MEDIUM

BACKGROUND OF THE INVENTION

1. Field of the Invention

The present invention relates to a disk-type information recording and playback, device for storing data, and in particular, relates to a disk-type information recording and playback device for use with a storate medium formatted by a ZCAV system.

2. Description of the Related Art

In a constant angular velocity ("CAV") system, a disk-type storage medium, hereinafter referred to as a disk, having a recording area divided into multiple concentric tracks, is rotated at a constant angular velocity. The storage capacity per track is determined by the number of recordable marks, equal to the number of recordable sectors, at the extreme inner circumference of the recording area. This limits the total recording capacity of the disk.

In known disk-type information recording and playback devices, such as an optical disk device or a fixed disk device, an improved formatting procedure called a zone constant angular velocity (CAV) system (hereunder abbreviated as "ZCAV") is used to increase the storage capacity.

Figure 5:
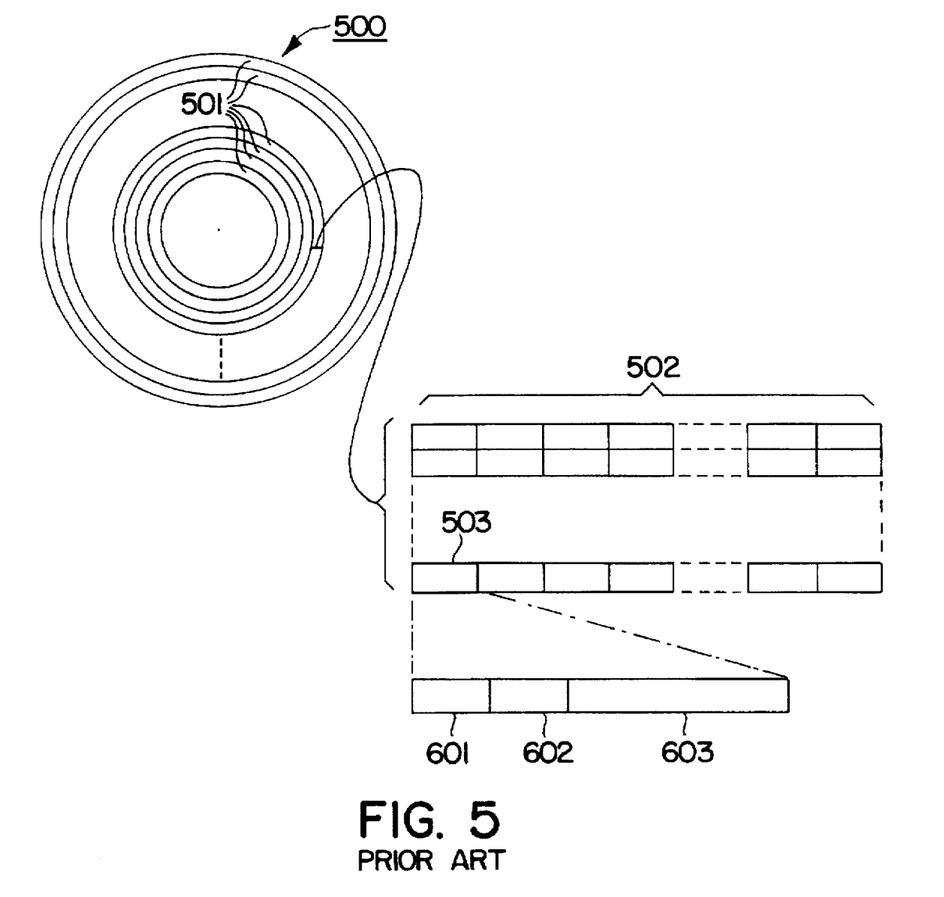
FIG. 5 is a diagram of a ZCAV system disk medium in accordance with the prior art.

FIG. 5 shows an example of a disk 500 formatted in accordance with the ZCAV system. A set of multiple tracks 502, with multiple sectors 503, are formed on the recording surface of the disk 500. The tracks 502 are grouped into concentric zones 501, starting from the innermost circumference of the disk and extending outwards. Each sector 503 comprises a sector mark 601, which indicates the beginning of that sector 503, an ID section 602, in which the address (ID) of the sector 503 is recorded, and an information section 603, into which data is recorded. The tracks 502 in each zone 501 are usually uniform, but the number of tracks 502 in each zone 501 may differ. By dividing the tracks 502 into several zones 501, the storage capacity of each track 502 is determined by the number of recordable marks, equal to the number of recordable sectors of the track 502 at the extreme inner circumference of the zone 501 to which the track belongs. The number of sectors 503, formed on each track 502, differs for each zone 501. Thus, the storage capacity of each zone differs. The zone 501, at the extreme inner circumference, has the smallest number of sectors and the number of sectors 503 increases by M sectors (where M is an integer of 1 or more, usually 1) with each zone as the outer circumference of the disk 500 is approached. As a result, a disk formatted with the ZCAV system has a larger total recording capacity than a disk formatted with the CAV system.

When writing and reading data to and from a disk 500 formatted with the ZCAV system, the disk 500 is rotated at a constant angular velocity. Consequently, the linear velocity of the disk 500 is faster toward the outer circumference, so the recording frequency of each zone 501 becomes higher in the zones closer to the outer circumference.

In performing reading and writing of data from sectors 503, the information recording and playback device uses a head to detect the sector mark 601, and then activates a timer. The read timing is controlled by the timer, and the ID section 602 is read. By repeating these operations, a target sector is searched for and found. When the head has accessed the target sector, the read or write timing is controlled by a timer, and reading or writing of the data to the information section 603 is performed. Therefore, accurate timing control, and reliable detection of the sector mark 601 by the head are required to reliably read or write data. Accurate timing control by the timer can be achieved if the reference clock frequency which operates the timer is equal to the recording frequency of the target sector 503. Reliable detection of the sector mark 601 can be achieved if the sector mark 601 is made into a shape which cannot be generated by any combination of the data in the ID section 602 or the data section 603.

Figure 6A:
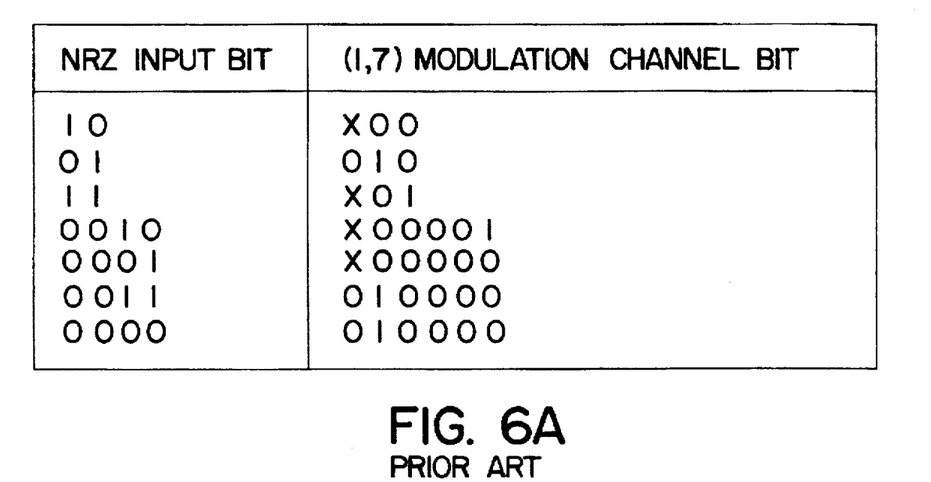
FIG. 6(a) is a table showing the NRZ input bit in relation to a channel bit in accordance with the prior art.

FIG. 6(a) is a diagram showing a typical (1,7) modulation mark edge recording system which is generally used as the ID and data recording method in a ZCAV formatted disk. In a (1,7) modulation mark edge recording system, the information is converted to a code word in 2-bit or 4-bit units, and recording is performed so that the polarity for recording in the section 503, which corresponds to the "1" in the code word, is reversed.

Figure 6B:
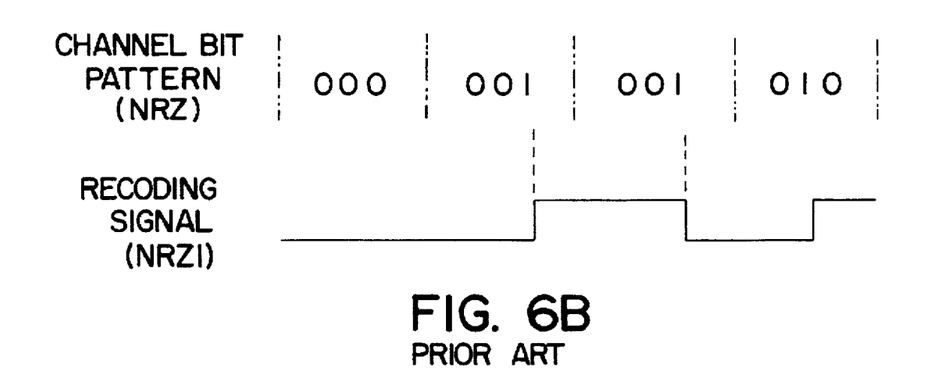
FIG. 6(b) is a timing diagram of a recording signal in accordance with the prior art.

FIG. 6(b) is a diagram showing the waveform of a playback signal from a disk 500 onto which information has been recorded in the (1,7) modulation mark edge recording system. The sections where the signal level of the playback signal is high are called marks, and the sections where the playback signal is low are called spaces.

Figure 7:
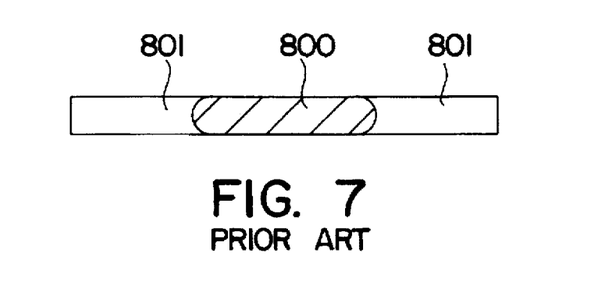
FIG. 7 is a diagram of a sector mark pattern in accordance with the prior art.

FIG. 7 is a diagram showing an example of a pattern used for sector marks. This pattern comprises a mark 800, 12 code bits in length in code word units, and two spaces 801, 8 code bits in length. In a (1, 7) modulation, there is a limit of a maximum of seven consecutive "0"s between the "1"s of the code word, so there are no marks 800 or spaces 801 of 8 or more code bits in the ID section and the data section. Thus, a sector mark 601, which is 12 code bits in length is unique when compared to the data and the ID data.

Figure 8A:
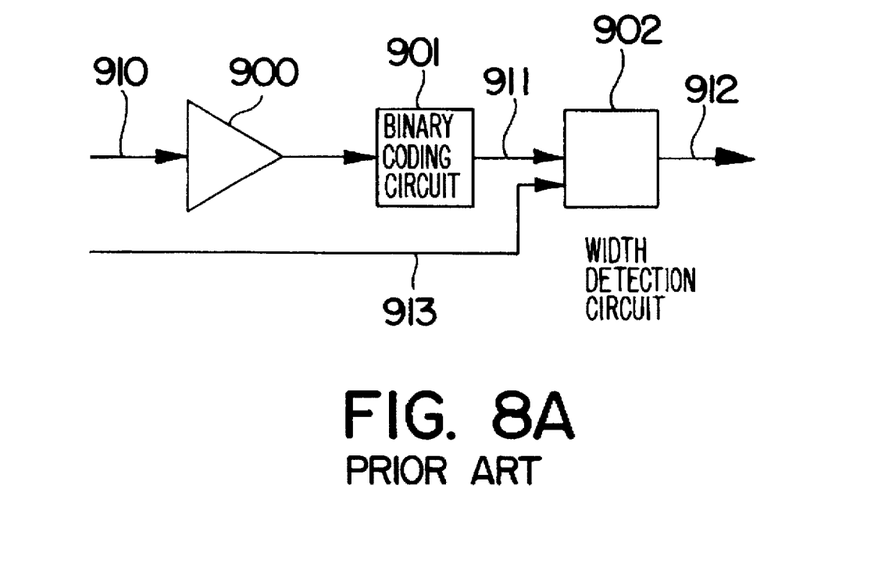
FIG. 8(a) is a block diagram of a sector mark detection circuit in accordance with the prior art.

FIG. 8(a) is a block diagram of a sector mark detection circuit for detecting sector mark configured in accordance with FIG. 7. A playback signal 910 from the head is amplified by an amplifier 900 and binary coded by a binary coding circuit 901 to produce a binary coded playback signal 911. Thereafter, the binary-coded playback signal 911 is input to a width detection circuit 902. In the width detection circuit 902, marks (actually the high-level signals having a length of 12 code bits) with a width of 12 code bits and which are included among the sector marks are detected and a sector mark detection signal 912 is output.

Figure 8B:
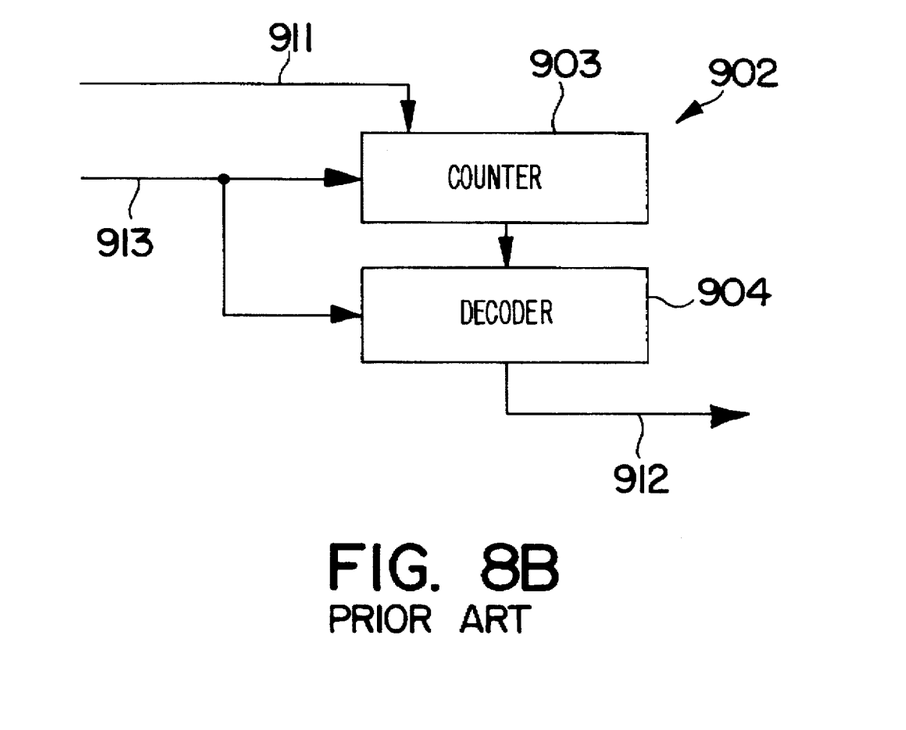
FIG. 8(b) is a block diagram of a width detection circuit in accordance with the prior art.

FIG. 8(b) is a diagram of the width detection circuit 902. A counter 903 is connected to a clock 913 which outputs a signal having a frequency which is L times the recording frequency of the sector mark (L is an integer of 1 or more). By way of example, it is assumed that L=1. The counter 903 starts a count at the starting edge of the high level section of the binary-coded signal 911. A decoder 904 determines the contents of the counter 903 at the ending edge of the high level section. A sector mark detection signal 912 is output when a high level signal with a length of 12 code bits is detected.

The ZCAV system requires a clock signal, which has the same frequency as the recording frequency of the zone to which the target sector belongs, supplied to both the counter 903 of the width detection circuit 902 of the sector mark detection circuit and to the timer which controls the read or write timing. When it is necessary to move the head to the zone to which the target sector belongs, to perform reading or writing of data in the desired section, the reference clock of the timer and the clock supplied to the counter 903 of the width detection circuit 902 must be immediately switched to the same frequency as the recording frequency of the zone to which the head is being moved. This allows sector mark detection and timing control for ID reading or data reading or writing to be performed.

However, in a ZCAV system, if there is an error during moving of the head, and the head is moved to a zone other than that to which the target sector belongs, the target sector, and of course, the sector mark of any sector, cannot be detected because the recording frequency of the zone which has been reached and accessed by the head differs from the frequency of the clock supplied to the counter 903 of the width detection circuit 902 of the sector mark detection circuit. That is, the width detection circuit 902 cannot recognize a high level signal, which has a length of 12 code bits, as the pattern of the sector mark. Thus, it becomes impossible to detect the sector mark and, timing control of ID reading, which is triggered by this detection, cannot be accomplished. Therefore, the ID is impossible to read. For example, even if the sector mark is detected, and the timer is activated, the timing control of ID reading cannot be accomplished because the reference clock input to the timer differs from the recording frequency of the zone currently being accessed by the head. This results in a hang-up and the information recording and playback device ceases to operate.

SUMMARY OF THE INVENTION

Accordingly, it is an object of the present invention to provide a ZCAV information system recording and playback device which is able to detect the sector mark even when the head has moved to a zone other than the zone to which the target sector belongs.

It is a further object of the present invention to provide an information recording and playback device which can quickly recover from head movement errors.

It is another object of the present invention to provide a method of finding a target sector in a disk formatted with the ZCAV system which can recover from movement errors in the head.

Additional objects and advantages of the invention will be set forth in part in the description which follows, and, in part, will be obvious from the description, or may be learned by practice of the invention.

Objects of the present invention are achieved in storage medium comprising a recording surface onto which data is written to and read from, a plurality of tracks positioned on the recording surface, the tracks being divided into zones, a plurality of sectors positioned within each of the tracks, and a sector mark positioned within each of the sectors, the sector mark having a pattern which varies according to the zone in which the sector mark is positioned.

Objects of the present invention are also achieved by an information recording and playback device for reading and writing information on a recording medium having a plurality of tracks grouped into zones, the tracks being divided into sectors having frequencies which vary by zone, the information recording and playback device comprising a head to read and write sectors on the recording medium, at least two sector mark detection units connected to the head and adapted to detect identifying marks in said sectors, and a control unit connected to the sector mark detection units to configure a first sector mark detection unit to detect the identifying marks in the sectors contained in the zone which contains a target sector, the control unit configuring the remaining sector mark detection units to detect the identifying marks in the sectors contained in the zones adjacent to the zone which contains the target sector.

Objects of the present invention are further achieved by a method of finding a target sector on a ZCAV formatted disk comprising attempting to move a reading head to a zone containing the target sector, reading from the disk from where the reading head was moved, determining if an identifying mark was read from a zone containing the target sector, determining if an identifying mark was read from a zone adjacent to the zone containing the target sector, repeating the steps from attempting to move the reading head until determining that an identifying mark was read from a zone containing the target sector, and finding the target sector within the zone containing the target sector.

Objects of the present invention are also achieved in a disk-type medium having a recording surface comprising multiple tracks formed on the recording surface, the multiple tracks being grouped into multiple zones, the tracks in each zone being divided into individual sectors which differ in length in each zone, and a sector mark which indicates the beginning of the sector is written in each sector according to a pattern which differs according to the zone to which that sector belongs.

Objects of the present invention are also achieved in a disk type medium having a recording surface comprising multiple tracks formed on the recording surface, the multiple tracks being grouped into multiple zones, the tracks in each zone being divided into individual sectors which differ in length by zone, a sector mark which indicates the beginning of the sector is written in each sector, and the polarity of the patterns of the sector marks of adjacent zones being mutually opposite.

Objects of the present invention are also achieved in an information recording and playback device which performs recording or playback of information in sector units on a disk-type recording medium having a recording surface in which multiple tracks are formed on the recording surface, the multiple tracks being grouped into multiple zones, the tracks belonging to each zone being divided into individual sectors which differ in length by zone, a sector mark which indicates the beginning of each sector is written in each sector according to a pattern which differs according to the zone to which that sector belongs; the information recording playback device comprising a plurality of sector mark detection circuits which detect the aforementioned sector marks, a control circuit which causes each of the aforementioned sector mark detection circuits to correspond to all or part of the multiple zones and which causes detection of the sector marks of the zones which correspond to the respective sector mark detection circuits to be performed, and a reference clock generation circuit, which switches the reference clock frequency, to a frequency which corresponds to the zones corresponding to the sector mark detection circuit, which has detected the sector mark.

Objects of the present invention are also achieved in an information recording and playback device which performs recording or playback of information by sector units in a disk-type recording medium having a recording surface in which multiple tracks are formed, the aforementioned multiple tracks being grouped into at least two zones, the tracks belonging to each zone being divided into their own individual sectors which differ by zone, and the sector mark which indicates the beginning of the sector is written in each sector at a recording frequency peculiar to the zone to which the sector belongs, the information recording playback device comprising a first sector mark detection circuit, for detecting the sector mark of the first zone, a second sector mark detection circuit, for detecting the sector mark of the second zone, and a clock generation circuit, which outputs a clock signal, having a frequency which corresponds to the recording frequencies of the sector marks of the zones which correspond to the respective first and second sector mark detection circuits a, a control circuit which determines the zone which is accessed by the head based on a sector mark detection signal output from either of the sector mark detection circuits, and switching the reference clock frequency necessary for recording or playback of information in sectors to a frequency which corresponds to the zone being accessed by the aforementioned head.

Objects of the present invention are also achieved in an information recording and playback device which performs recording or playback of information on a disk-type recording medium having a recording surface wherein sector marks are recorded in first and second zones at mutually opposite polarities in odd-numbered zones and even-numbered zones from the inner circumference or from the outer circumference of the disk-type recording medium and each of the aforementioned sector mark detection circuits detect only sector marks of the polarity of the zones which correspond to each.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
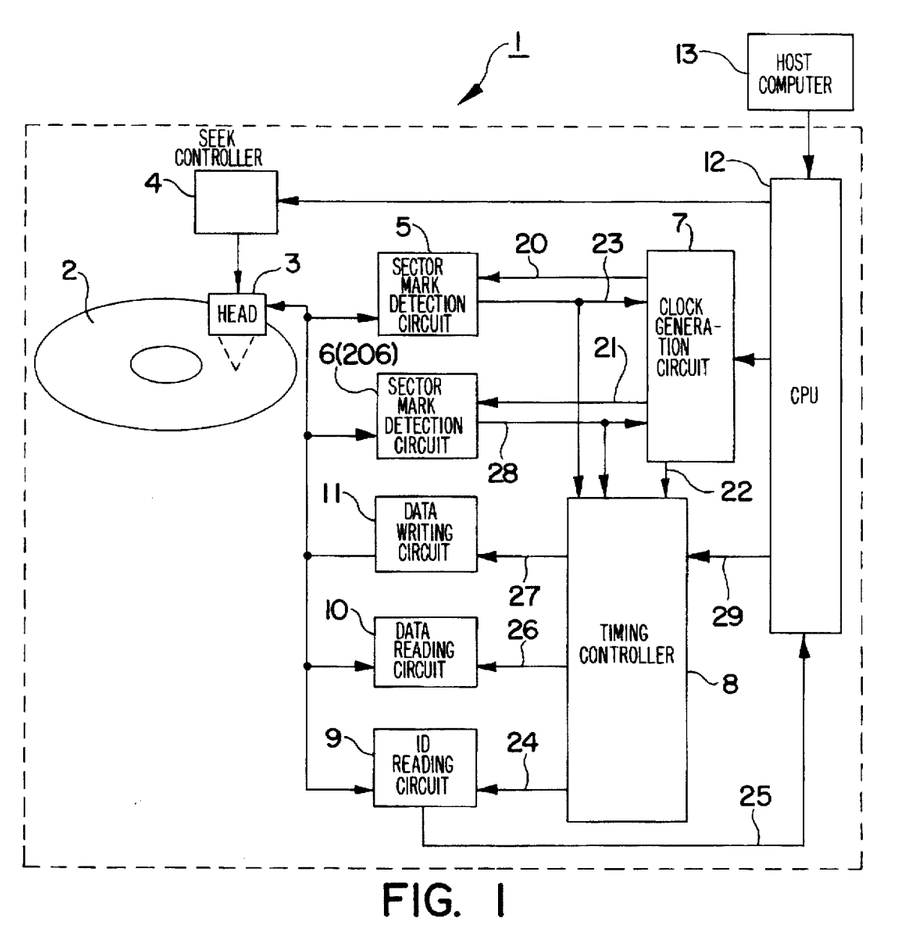
FIG. 1 is a block diagram of the information recording and playback device according to a first preferred embodiment of the present invention.

FIG. 1 is a block diagram showing an information recording and playback device 1 in accordance with a first embodiment of the present invention. The information recording and playback device 1 in accordance with the first preferred embodiment of the present invention operates with a disk-type media, i.e. a disk, formatted with the ZCAV system.

The information recording and playback device 1 is equipped with a conventional sector mark detection circuits 5 and 6, and a clock generation circuit 7. The sector mark detection circuits are preferably similar in design to those described with reference to the prior art as shown in FIG. 8(a). The clock generation circuit 7 outputs a clock signal 20 having a frequency which matches the recording frequency of the zone which contains the target sector to the sector mark detection circuit 5. The clock generation circuit 7 also outputs a clock signal 21, which has the recording frequency of a zone which is adjacent to the zone containing the target sector, to the sector mark detection circuit 6. A CPU 12 is connected to a host computer 13 which transmits signals commanding the reading or writing of data.

As set forth above, a disk 2 is divided into zones comprising multiple tracks. The tracks of each zone are divided into a number of sectors. The tracks have characteristics peculiar to the zone to which they belong. Specifically, each sector has sector marks recorded at a recording frequency peculiar to the zone to which they belong.

When a command to read or write data to a target sector of the recording surface of the disk 2 is issued by the hose computer 13, the CPU 12 determines the zone to which the target sector belongs and the adjacent zones. When there are adjacent zones on both the inner circumference side and the outer circumference side, the zone which is closest to the track to which the target sector belongs is used. The reference clock generation circuit 7 is then signaled the identity of the two zones. The reference clock generation circuit 7 then outputs clock signals 20 and 22, which have frequencies equal to the recording frequencies of the zones containing the target sectors to sector mark detection circuit 5 and to a timing controller 8. The clock generation circuit 7 also outputs a clock signal 21, which has a frequency equal to the recording frequency of the closest adjacent zone, to the sector mark detection circuit 6.

The CPU 12 instructs a seek controller 4 to move a head 3 to the track containing the target sector. If the movement is successful, even in the event of an error, the sector mark is detected by sector mark detection circuit 5 which outputs a sector mark detection signal 23.

When a sector mark detection signal 23 is output from the sector mark detection circuit 5, the reference clock generation circuit 7 confirms that the head 3 has moved to the zone containing the target sector. This indicates that the movement, i.e. seek operation, was successful, and the clock signal 22 continues to be output.

An internal timer, triggered by the sector mark detection signal 23, uses the clock signal 22 as a reference. The timing controller 8 outputs an ID read start signal 24 to an ID reading circuit 9 in time with the beginning of the ID section. The ID reading circuit 9, triggered by the ID read start signal 24, detects the ID section and outputs an ID value 25.

The CPU 12 confirms which track is currently being accessed by the head based on an ID value 25 output from the ID reading circuit 9. When the track which contains the target sector is not being accessed, the CPU once again tries to move the head 3 to the track containing the target sector (if the track on the disk is in a spiral form, the present track is followed). Once the ID is read, the head 3 is made to access the target sector in the track.

When the CPU 12 determines that the head 3 was able to access the target sector, based on the ID value 25 output from the ID reading circuit 9, it notifies the timing controller 8 by a signal 29. Based on this signal, when the data section starts, the timing controller 8 outputs a read start signal 26 to a data reading circuit 10, in the case of a read command, or it outputs a write start signal 27 to a data writing circuit 11, in the case of a write command.

On the other hand, when the head 3 has moved, in error, to the zone adjacent to the zone containing the target sector, the sector mark is detected by the sector mark detection circuit 6 which outputs a sector mark detection signal 28. When a sector mark detection signal 28 is received, the reference clock generation circuit 7 determines that the head 3 has moved to a zone which is adjacent to the zone containing the target sector. Then, the frequency of the clock signal 22 is modified to match the frequency of the recording frequency of the adjacent zone.

The sector mark detection signal 28 triggers the timing controller 8 to activate an internal timer. The internal timer is started when the clock signal 22 is output from the reference clock generation circuit 7. Thereafter, an ID read signal 24 is output to the ID reading circuit 9 in time with the start of the ID section. The ID read signal 24 triggers the reading circuit 9 to execute an ID reading.

Based on output from the ID reading circuit 9, the CPU 12 determines which track is currently being accessed by the head 3 from the ID value 25 output from the ID reading circuit 9. Then, the CPU 12 resets the clock signals 20, 21, and 22, which were output by the reference clock generation circuit 7 to the sector mark detection circuits 5 and 6 and to the timing controller 8. Thereafter, the CPU 12 causes the seek controller 4 to move the head 3 to the track containing the target sector.

Although the first embodiment of the present invention has been described with respect to a particular configuration, it will be recognized that the first embodiment is not limited to the particular configuration and modifications and changes are possible. For example, while according to the first preferred embodiment, the sector mark detection circuit 5 is controlled to correspond to sector mark detection in the zone containing the target sector and sector mark detection circuit 6 is controlled to correspond to sector mark detection in a zone adjacent to the zone which contains the target zone, the correspondence of the sector mark detection circuits 5 and 6 may be reversed. Also, in the first embodiment, there were two sector mark detection circuits, but one skilled in the art will recognize that more sector mark detection circuits may be used. For example, when I sector mark detection circuits (where I is an integer and where $2 \leq 1 \leq$ number of zones) are used, each respective sector mark detection circuit can be made to correspond to the next closest zone to the zone to which the target section belongs and to the track containing the target sector. In this configuration, the respective sector mark detection circuits receive a clock signal which has a frequency equal to the recording frequency of the corresponding zone, and performs the processing for switching clock signals from sector mark detection as set forth above. Thus, ID reading can be performed not only in the zone to which the target sector belongs, but also in the zones which surround the zone containing the target sector. After the current position is recognized, movement of the head to the target sector can be quickly executed.

Figure 2:
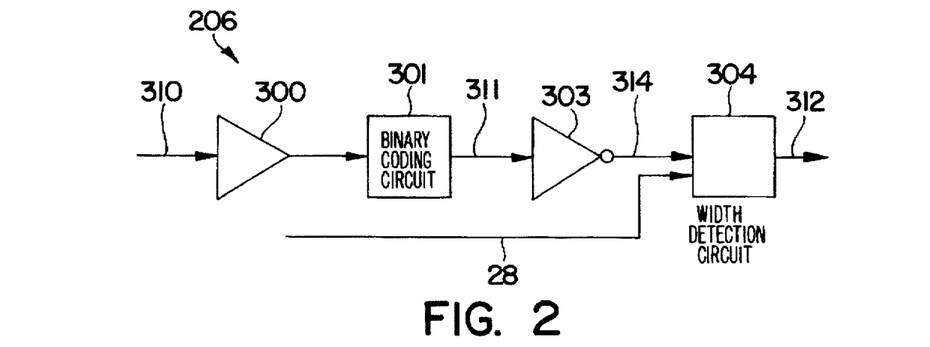
FIG. 2 is a block diagram of a sector mark detection circuit for use in an information recording and playback device according to a second preferred embodiment of the present invention.

FIG. 2 is a block diagram showing an alternate construction of a sector mark detection circuit 6 for use in an information recording and playback device 1, as set forth with respect to FIG. 1, in accordance with a second preferred embodiment of the present invention. Where the recording frequency in the adjacent zones have the physical lengths of marks which are 12 code bits in length, the respective sector marks of both zones may be very similar. In such a case, there is a danger that a mis-detection of the sector marks will occur. For example, in the first embodiment of the present invention, the sector mark detection circuit 6 might signal a detection when the head 3 accesses the zone to which the target sector belongs, or the mark detection circuit 5 might signal a detection when the head 3 accesses a zone adjacent to the zone containing the target sector. In either case a sector mark detection signal would be output from each of the sector mark detection circuits 5 and 6. When a mis-detection of the sector mark occurs, the reference clock generation circuit 7 cannot determine which zone the head 3 is accessing. As a result, it becomes impossible to switch the frequency of the head to a frequency which corresponds to the clock signal being output to the timing controller 8, and it becomes impossible to accurately execute ID reading and data reading or writing.

To prevent mis-detection, the polarity of the sector marks of adjacent zones may be reversed as to each other. Then, the corresponding sector mark detection circuits are controlled to detect only the polarity of the sector marks of the corresponding zones, and those with the opposite polarity to the target sector will not be recognized as sector marks.

In accordance with the second preferred embodiment, the sector mark detection circuit 6 detects spaces with widths of 12 code bits which are formed on the surface of the disk 2 having a certain polarity. A playback signal 310 from the head 3 is amplified by an amplifier 300, and input to a binary coding circuit 301 and binary-coded. A binary-coded signal 311 output from the binary coding circuit 301 is reversed in polarity by an inverter 303 and a resultant binary-coded signal 314 is input to a width detection circuit 304. The width detection circuit 304 has the same functions and as the configuration width detection circuit 902 illustrated in FIG. 8(b). The width detection circuit 304 detects high level signals having a length of 12 code bits from the resultant binary-coded signal 314, and outputs a sector mark detection signal 312. While the disk 2 has sectors similar to the disk configuration as set forth in FIG. 5, and the method of recording the ID and data is similar as that set forth with reference to FIG. 5, the multiple individual zones which are formed on the recording surface of the disk 2 are divided into the two groups of odd-numbered and even-numbered zones. The odd-numbered and even-numbered zones alternate starting from the inner circumference of the disk 2 (or alternately the outer circumference). The sector marks in the odd-numbered zones preferably have the same configurations as set forth in FIG. 7.

Figure 3:
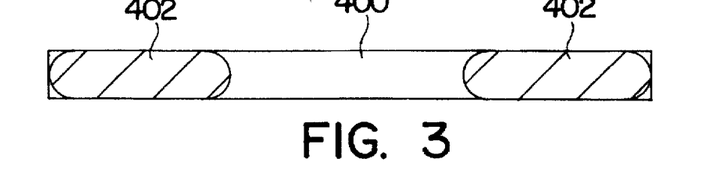
FIG. 3 is a diagram of a sector mark pattern for use in the second preferred embodiment of the present invention.

FIG. 3 is a diagram showing the preferred pattern of the sector marks in the even-numbered zones. The sector marks in the even-numbered zones comprise a space 400, with a length of 12 code bits in code word units, and a pair of marks 402 with a length of 8 code bits. Thus, the polarity of the sector marks of the even-numbered zones is opposite of that of the sector marks of the even-numbered zones.

In accordance with the second embodiment, when a command to read or write data corresponding to the desired sector (target sector) of the recording surface of the disk 2 is issued by the host computer 13, the CPU 12 identifies which zone contains the target sector and the adjacent zones. When there are adjacent zones on both the inner circumference side and the outer circumference side, the zone which is closest to the track containing the target sector is used. Then, the reference clock generation circuit 7 is notified of the location of the target zone and the adjacent zone. When the zone containing the target sector is an odd-numbered zone, the adjacent zone is an even-numbered zone, and when the zone containing the target sector is an even-numbered zone, the adjacent zone is an odd-numbered zone. By way of example, the operation of the information recording and playback device 1 in accordance with the second preferred embodiment will be described with respect to an odd-numbered zone containing the target sector on the inner circumference of the disk 2. Therefore, the adjacent zone is an even-numbered zone.

First, the reference clock generation circuit 7 outputs a clock signal 20, having a frequency equal to the recording frequency of the odd-numbered zones, to the sector mark detection circuit 5. The reference clock generation circuit 7 also outputs a clock signal 21, having a frequency equal to the recording frequency of the even-numbered zones, to the sector mark detection circuit 206. At the same time, the reference clock generator circuit 7 outputs a clock signal 22 having a frequency equal to the recording frequency of the zone containing the target sector to the timing controller 8.

Thereafter, the CPU 12 causes the seek controller 4 to move the head 3 to the track containing the target sector. When the head 3 has moved to the track containing the target sector, even though an error occurred in movement, the sector mark is detected by the sector mark detection circuit 5. Once the sector mark detection circuit 5 detects the target sector mark it outputs a sector mark detection signal 23.

When the sector mark detection signal 23 is output, the reference clock generation circuit 7 determines that the head 3 has moved to the zone containing the target sector and continues to output the clock signal 22 to the timing controller 8. Thereafter, ID reading is executed, the track which is being accessed by the head 3 is recognized, and finally, the head 3 accesses the target sector as in the first embodiment.

When there is an error in the movement of the head 3, and the head 3 has moved to a zone adjacent to the zone containing the target sector, the sector mark is detected by sector detection circuit 206 which outputs a sector mark detection signal 28. The reference clock generation circuit 7 determines that the head 3 has moved to the adjacent zone and switches the clock signal to a frequency equal to the frequency of the adjacent zone.

Where there has been an error in movement of the head 3, the head 3 is moved after an ID reading is executed and the track currently being accessed by the head 3 is recognized.

Although the second embodiment of the present invention has been described with respect to a particular configuration, it will be recognized that the second embodiment is not limited to the specific configurations. For example, according to the second embodiment the sector mark detection circuit 5 corresponds to the odd-numbered zone, and the sector mark detection circuit 206 corresponds to the even-numbered zones, but the correspondence of the sector mark detection circuits and the zones may be reversed.

Also, while the second preferred embodiment has been described with respect to two sector mark detection circuits, more may be used, for example, I sector mark detection circuits (where I is an integer and where $2 \leq I \leq$ number of zones) may be used inside the information recording and playback device 1. However, it is desirable that, half of the I sector corresponds to the odd-numbered zones and half corresponds to the even-numbered zones.

Figure 4:
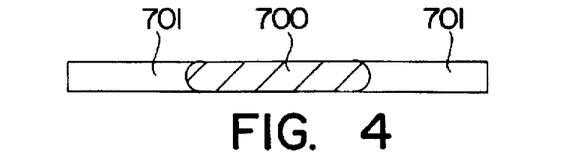
FIG. 4 is a diagram of a sector mark pattern for use in a third preferred embodiment of the present invention.

FIG. 7 is a diagram which shows a pattern of a sector mark for use in a zone N in accordance with a third preferred embodiment of the present invention. The mark according to FIG. 7 comprises a 12 bit code mark and two spaces. According to the third embodiment of the present invention the pattern of the sector marks differ in length by zone. FIG. 4 is a diagram which shows the pattern of the sector marks of the zone N+1, which is adjacent to zone N, are shown in FIG. 7. In FIG. 4, the sector mark 700, comprises a length of 14 code bits and two spaces 701, with lengths of 7 code bits each.

A disk encoded with the described two sector marks can be read from and written to as set forth in the first embodiment. However, the width detection circuits 903 see (FIG. 8) inside the sector mark detection circuits 5 and 6 are modified such that the detectable code bit width of marks can be changed by the CPU 12. Thus, the sector mark detection circuits 5 and 6 can detect the sector marks as shown in FIG. 7 or in FIG. 4 with the appropriate instruction from the CPU 12.

When a command to read or write data which corresponds to the desired sector (target sector) of the recording surface of the disk is issued by the host computer 13, the CPU 12 inside the information recording and playback device 1 computes the zone containing the target sector and the adjacent zones. When there are adjacent zones on both the inner circumference side and the outer circumference side, the zone which is closest to the track containing the target sector is used and a signal is sent to the reference clock generation circuit 7. According to the third embodiment, the zone which contains the target sector is termed zone N, and the adjacent zone is termed zone. N+1.

The CPU 12 sets the sector mark detection circuit 5 to detect a sector mark of zone N (i.e., a mark with a length of 12 code bits), and sets the sector mark detection circuit 6 to detect a sector mark of zone N+1 (i.e., a mark with a length of 14 code bits).

The CPU 12 next uses the seek controller 4 to move the head 3 to the track containing the target sector. When the head 3 has been moved to the track containing the target sector, even though an error occurred in the movement, the sector mark is detected by sector mark detection circuit 5, which outputs a sector mark detection signal 33.

Based on the sector mark detection signal 23, the reference clock generation circuit 7 determines that the head 3 has moved to the zone containing the target sector, and continuing to output the clock signal 22 to the timing controller 8.

Thereafter, an ID reading is executed, the track which is being accessed by the head 3 is recognized, and finally, the head 3 is made to access the target sector.

On the other hand, when there has been an error in the movement of the head 3, and the head 3 has moved to the adjacent zone, the sector mark detected by sector mark detection circuit 6, and sector mark detection signal 28 is output. The reference clock generation circuit 7 determines that the head 3 has moved to the adjacent zone when the sector mark detection signal has been output from the sector mark detection circuit 6. Thereafter, the clock signal 22, output to the timing controller 8, is switched to a clock signal which has a frequency equal to the recording frequency of the adjacent zone. Thereafter, the head 3 is once again moved, after ID reading is executed and the track currently being accessed by the head 3 is recognized.

Although the third embodiment of the present invention has been described with respect to a specific configuration, it will be recognized that the third embodiment is not limited to the specific configurations. For example, in the third preferred embodiment, the sector mark detection circuit 5 corresponds to the sector mark detection in the zone containing the target sector and the sector mark detection circuit 6 corresponds to the sector mark in the adjacent, but the correspondence of the sector mark detection circuits and the zones may be reversed. Also there were two sector mark detection circuits in the third embodiment, but more sector mark detection circuits may be used.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, in the first, second, and third embodiments, the pattern of the sector marks and the method of detecting the pattern was width detection of the pattern of a single mark (or space), similar to the prior art, but other patterns and pattern detection methods may be used, for example, the method presented in Japanese Patent Publication Number Sho 58-169337.

According to the preferred embodiments, even where there has been an error in movement of the head, and the head has moved to a zone other than that to which the target sector belongs, an ID reading can be performed in that zone, and the head can be quickly moved to the zone containing the target sector.

In accordance with the second and third embodiments, even when the recording frequencies between adjacent zones are similar, information recording or playback can be performed without mis-detections in the sector mark detection circuit.

What is claimed is:

1. An information recording and playback device for reading and writing information on a recording medium having a plurality of tracks grouped into zones, the tracks being divided into sectors having frequencies which vary by zone, the information recording and playback device comprising:

a head to read and write sectors on the recording medium;

at least two sector mark detection units connected to said head adapted to detect identifying marks in said sectors;

a clock generation circuit which outputs a different clock signal to each sector mark detection unit; and a control unit connected to said clock generation circuit to output different clock signals so as to enable a first sector mark detection unit to detect the identifying marks in the sectors contained in the zone which contains a target sector and to enable the remaining sector mark detection units to detect the identifying marks in the sectors contained in the zones adjacent to the zone which contains the target sector.

2. An information recording and playback device, as set forth in claim 1, wherein the identifying marks in adjacent zones have different polarities.

3. An information recording and playback device as set forth in claim 1, wherein the identifying marks in adjacent zones have different lengths.

4. An information recording and playback device, as set forth in claim 1, wherein said control unit causes said head to move to the zone containing the target sector when one of the remaining sector mark detection units detects an identifying mark.

5. An information recording and playback device, as set forth in claim 1, wherein the identifying marks vary according to the zone in which the sector is contained.

6. An information recording and playback device, as set forth in claim 5, wherein the identifying marks in adjacent zones have different polarities.

7. An information recording and playback device, as set forth in claim 5, wherein the identifying marks in adjacent zones have different lengths.

8. An information recording and playback device, as set forth in claim 5, wherein the recording medium is an optical disk.

9. An information recording and playback device, as set forth in claim 5, wherein the recording medium is a magnetic disk.

10. A method of finding a target sector on a ZCAV formatted disk comprising:

attempting to move a reading head to a zone containing the target sector;

reading from the disk from where the reading head was moved;

determining if an identifying mark was read from a first zone containing the target sector using a clock frequency associated with the first zone;

simultaneously determining if the identifying mark was read from a zone adjacent to the zone containing the target sector using a clock frequency associated with the second zone;

repeating the steps from attempting to move the reading head until determining that an identifying mark was read from a zone containing the target sector; and finding the target sector within the zone containing the target sector.

* * * * *